United States Patent [19]

Alderson et al.

[11] Patent Number: 4,785,634
[45] Date of Patent: Nov. 22, 1988

[54] AIR TURBINE CYCLE

[75] Inventors: Edgar D. Alderson, Ballston Spa, N.Y.; William M. Farrell, Cincinnati, Ohio

[73] Assignee: General Electric Company, Schenectady, N.Y.

[21] Appl. No.: 55,398

[22] Filed: May 28, 1987

[51] Int. Cl.⁴ ............................................. F02C 1/04
[52] U.S. Cl. ............................................. 60/682; 60/648
[58] Field of Search .......................... 60/648, 650, 682

[56] References Cited

U.S. PATENT DOCUMENTS

| | | | |
|---|---|---|---|
| 2,319,995 | 5/1943 | Keller | 60/650 |
| 2,341,490 | 2/1944 | Traupel | 60/39.183 |
| 2,482,791 | 9/1949 | Nettel et al. | 60/39.183 |
| 2,645,083 | 7/1953 | Brunner | 60/650 |
| 2,658,349 | 11/1953 | Keller | 60/682 |
| 2,994,198 | 8/1961 | Snyder | 60/682 X |
| 4,492,085 | 1/1985 | Stahl et al. | 60/649 |

Primary Examiner—Stephen F. Husar
Attorney, Agent, or Firm—Jerome C. Squillaro

[57] ABSTRACT

The use of hot gas generators which produce corrosive or abrasive products of combustion have precluded the use of gas turbines in a direct flow path of the combustion products. It is preferable to utilize non-contact gas to gas heat exchangers in order to transfer heat from a hot gas stream to a working fluid. A first heat exchanger connected to a gas furnace is used to raise the temperature of an air turbine inlet gas. A second heat exchanger is used to raise the temperature (prewarm) of compressor discharge air to the air turbine air inlet, the second heat exchanger connected to the air turbine exhaust. A third heat exchanger preheats the air input into a furnace.

1 Claim, 2 Drawing Sheets 4,785,634

AIR TURBINE CYCLE

This invention relates to combustorless air turbine cycles; and, in particular, this invention relates to heat generating processes used in combination with air turbine cycles.

BACKGROUND OF THE INVENTION

The use of hot gas generators which produce corrosive or abrasive products of combustion have precluded the use of gas turbines in a direct flow path of combustion products. In a prior art heat generating cycle, a heat recovery steam generator was used in combination with a steam turbine and electrical generator to recover valuable heat which would otherwise be wasted. An air turbine in combination with a gas to air heat recovery heat exchanger provides a means for utilizing what would be an otherwise wasted hot exhaust gas stream.

In U.S. patent application Ser. No. 747,552; filed June 21, 1985 for an Air Cycle Thermodynamic Conversion System, and assigned to the assignee of the present invention, the efficiency of a so-called air bottoming cycle (ABC) was demonstrated and fully explained. To summarize the disclosure of that patent application, an air turbine drives a string of compressors which have intercoolers so that each stage output is cooled to about ambient before being sent on to the next stage. The intercooling process between compressors lowers the work input into the compressor necessary for providing the pressure rise. Moreover, as the compressed air leaves the final compressor stage, it is at a lower temperature so that the heat recovery from the gas turbine exhaust stack flow, with which it is in a heat exchange process, is also greater.

In U.S. patent application Ser. No. 552,213, having the same inventors as the present application and a common assignee, and filed on the same date: a coal gasification plant is shown wherein a gas turbine exhaust provides heat to an air bottoming cycle air turbine. The air turbine, in turn, drives a string of compressors to provide air to the air turbine and air for an oxygen plant which provides oxygen to a coal gasification plant. The coal gasification plant thereafter provides fuel to the gas turbine.

In some processes, such as are used in the manufacture of sulfuric acid, the hot gas products of a sulfur furnace must be cooled but cannot be expanded directly in a gas turbine because of the corrosive nature of the product gas. However, the process of producing sulfur dioxide gas requires a compressed air supply and therefore it would be desirable to provide a gas turbine/compressor package which could somehow use the heat produced in the sulfur burning furnace. In the prior art, the process included the provision of a heat recovery steam generator to absorb heat from the sulfur furnace hot gas stream and to produce steam for a steam turbine. The steam turbine would drive an electric generator to produce electricity some of which would be used to drive an electric motor and the remainder available to sell as power. The electric motor would, in turn, drive a compressor to supply compressed air to the sulfur burning furnace.

OBJECTS OF THE INVENTION

In accordance with the foregoing, it would be desirable to provide an air turbine cycle which is usable with and which will render more efficient certain processes.

It is an object of this invention to provide a high efficiency cycle for certain processes without the use of steam or water.

It is another object of this invention to provide a process cycle wherein the products of combustion never enter the turbomachinery but the heat of these products is used to drive turbomachinery.

It is another object of this invention to remove an optimum amount of heat from combustion gas as is feasible to ensure high efficiency.

Finally, it is another object of this invention to improve cycle efficiency by providing a heated air supply to the combustion process for producing a hot exhaust gas stream.

SUMMARY OF THE INVENTION

An air cycle turbine is provided with hot air through a heat exchange relationship with process heat. The process may be for the generation of a useful product or simply be available for the sole purpose of providing a hot exhaust gas stream. The air turbine may drive a string of compressors with intercoolers for the purpose of producing compressed air for the air turbine. In addition, there may be a need for a specific quantity or condition of compressor discharge air for combustion purposes, such that a boost or auxillary compressor may be added to a compressor string for providing the appropriate discharge air for the combustion process. In some applications, it may be appropriate to include air preheating for the combustion air input in order to reduce the fuel requirements in a combustor. Finally, a recuperative heat exchange may be included to preheat turbine air in a heat transfer relation with turbine exhaust gas prior to the heat exchange with process or combustion air.

DETAILED DESCRIPTION OF THE INVENTION

Figure 1:
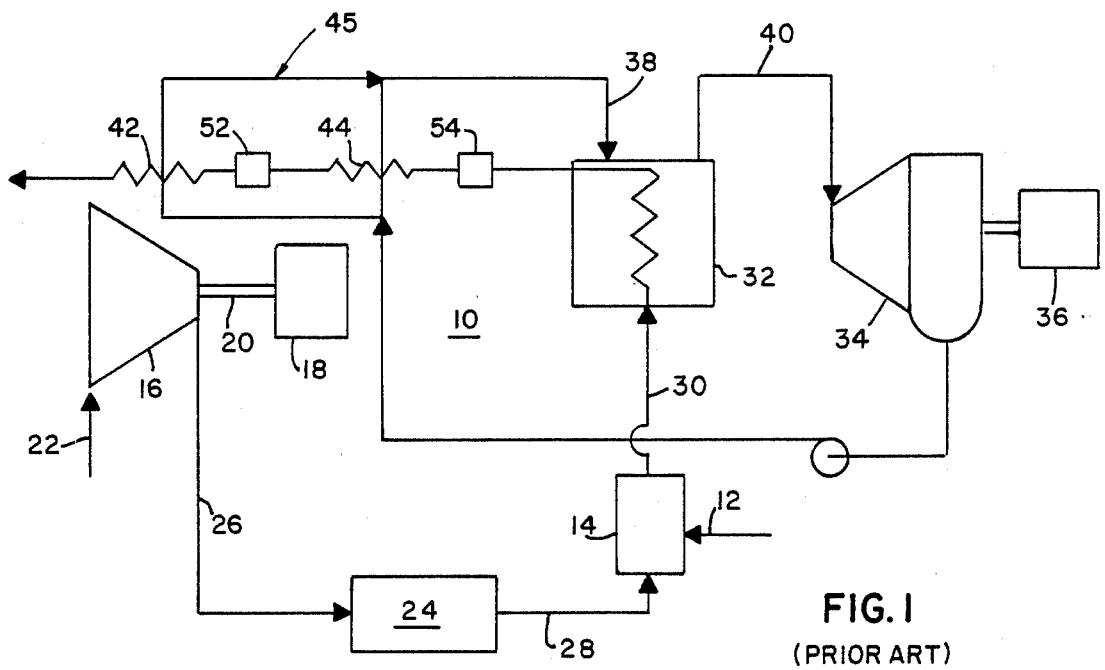
FIG. 1 is a schematic of a combined cycle including a hot gas producing cycle and a steam cycle in accordance with the prior art.

FIG. 1 is a schematic representation of a sulfuric acid producing process 10. Sulfur 12 is input into a furnace 14 where it is burned to produce a sulfur product gas SO2. The combustion process of the furnace requires an air input from a compressor 16 which is driven by an electric motor 18 through a connecting shaft 20. The air input into the compressor is indicated by the arrow 22 whereas an air dryer 24 may be interposed between the compressor discharge line 26 and the inlet line 28 to the sulfur burning furnace.

The output line 30 from the gas furnace carries a hot gas stream of SO2 which then, according to process requirements must be reduced in temperature in order to be converted catalytically to SO3 which will eventually be processed to a condensate sulfuric acid H2SO4. The heat reducing process can be made more efficient by the inclusion of a Rankine cycle including a heat recovery steam generator 32, a steam turbine and condenser 34 and an electric generator 36. Some of the electrical output of the electric generator may be used to power the electric motor 18 which drives the air compressor 16. The excess electric power is sold or displaces purchased power elsewhere. Condensate from the steam turbine is input into the heat recovery steam generator 32 on line 38 whereas steam is discharged from the heat recovery steam generator on line 40 and input into the steam turbine 34 or may be used elsewhere in the process. The heat exchange process in the heat recovery steam generator thus reduces the temperature of the hot gas stream according to process requirements whereas a steam output is made available from the heat recovery steam generator. In addition to the foregoing, additional heat exchange units 42 and 44 may be provided in a condensate loop 45 for added cooling of the product gas and to produce process steam. The cooled product gas SO2 is output from the heat exchanger 32 and subsequently processed through catalytic converters 52 and 54 in a manner known to the prior art, the details, of which, are not particularly important to the present invention except to the extent that the reaction is exothermic.

It has been suggested that the steam equipment could be eliminated by using a gas turbine connected directly to the output of a sulfur burning furnace so that the combustion products of the sulfur furnace could be expanded directly through the gas turbine. However, this approach has been avoided because of the corrosive nature of the product gas.

Figure 2:
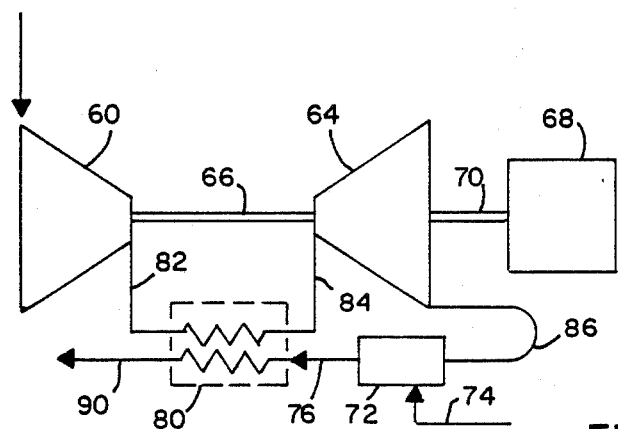
FIG. 2 is a schematic of another prior art process which utilizes a gas to gas heat exchange process for heating air input into an air turbine.

In searching for an approach which could utilize a gas turbine, while avoiding the introduction of corrosive gas into a turbine the embodiment of FIG. 2 was discovered in the prior art. FIG. 2 shows an air turbine cycle which includes an air compressor 60 which is driven by an air turbine 64 through an interconnecting shaft 66. The air turbine 64 may also drive an electrical generator or other load 68 through a connecting shaft 70. A furnace 72 is provided with fuel 74 such that combustion occurs within the furnace to produce a hot exhaust gas stream or product gas on line 76. The hot exhaust gas stream is input into a heat exchanger 80 where it passes in a heat exchange relation with compressor discharge air on line 82 whereupon hot air is provided on line 84 to the air turbine inlet. The hot air is expanded through the air turbine to drive a bladed rotor (not shown) which, in turn, drives the compressor and the electrical generator. The turbine exhaust is output on line 86 whereupon it is input into the furnace 72 for providing heated air to the combustion furnace. The prior art therefore includes an air turbine 64 having an inlet 84 and an exhaust 86; at least one main compressor 60 for supplying air to the air turbine, the air turbine drivingly connected to the main compressor through shaft 66. The means for generating a hot exhaust gas stream includes a furnace 72. A heat exchanger 80 passes the compressor air supply or discharge 82 in heat exchange relationship with the furnace hot exhaust gas stream 76 for heating the air supply to the air turbine inlet 84 and the means for providing a preheated air supply to the hot gas generating means includes the turbine exhaust duct or line 86 connected to the furnace 72. The product gas output of the heat exchanger on line 90 may then be sent on to further process for producing sulfuric acid.

The advantages of this cycle are readily apparent. The turbomachinery only uses clean air and can be made of conventional materials. The means for generating a hot gas stream can be conventional. The heat exchanger isolates the combustion products from the turbomachinery and can use materials consistent with current practice for static equipment handling such combustion products. This process is presented in U.S. Pat. No. 4,492,085 issued Jan. 8, 1985 and assigned to the assignee of the present invention. On the other hand, this process may be disadvantaged because of the potential high temperature of the output stream. In addition, the pressure and quantity of turbine exhaust air may not be suited to the stoichiometry of the furnace 72.

Figure 3:
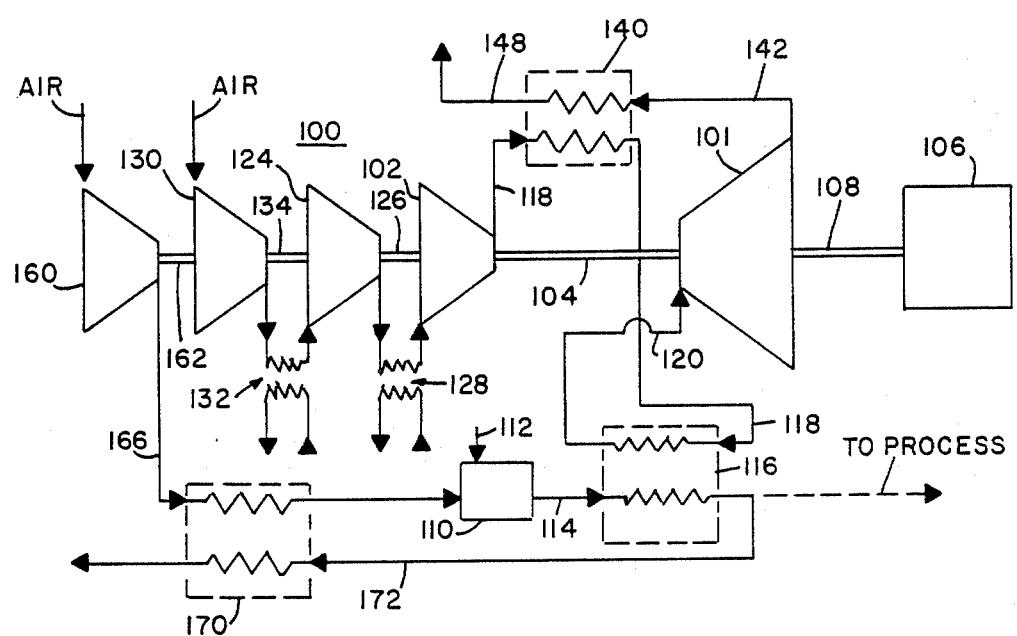
FIG. 3 is a schematic view of an air turbine cycle in accordance with the present invention.

Referring now to FIG. 3, an air turbine cycle 100 is shown which includes an air turbine 101 connected to drive a first main compressor 102 through shaft 104. The air turbine is further connected to drive an electrical generator or load 106 through an output shaft 108. Means for generating a hot exhaust gas stream includes a furnace 110 which has a fuel input 112. In the context of a process plant, the fuel supplied to the furnace may be sulfur for producing a hot exhaust gas stream of SO2. In a power plant, which uses coal as the fuel input 112, the furnace 110 may be an atmospheric fluidized bed (AFB) type of coal burner.

The furnace 110 provides a hot exhaust gas stream 114 to a first heat exchanger 116. A second counter flow stream input to the first heat exchanger is compressor discharge air 118 from the main compressor 102. The hot exhaust gas heats the main compressor discharge air prior to it being input into an air turbine inlet 120. A second main compressor 124 is connected to the first main compressor 102 by shaft 126 and ultimately driven by the air turbine through shaft 104 which drives the first main compressor. A first intercooler 128 connects the discharge end of the second main compressor 124 with the inlet end of the first main compressor 102 whereas a third main compressor 130 may be connected to the second main compressor through intercooler 132 and be driven by shaft 134 which is ultimately driven by the air turbine 101. Two or more compressors comprise a plurality of compressors. The advantage of the plurality of compressors with intercoolers is to lower the work put into providing the pressurized air while also lowering the temperature of the first main compressor discharge air so that the stack temperature of air turbine exhaust may be lowered for maximum heat recovery.

Heat recovery of air turbine exhaust gas is accommodated by a second heat exchanger 140 for preheating the compressor discharge air 118. The air turbine exhaust in duct 142 is input into the second heat exchanger 140 for prewarming the main compressor discharge air prior to its input into the first heat exchanger 116 upstream of the air turbine inlet. The advantage of prewarming the compressor discharge air is that it increases the output of the cycle and enables heat recovery of otherwise wasted air turbine exhaust gas. The output 148 from the second heat exchanger 140 may be sent to the stack to be discharged as waste gas. However, it is pointed out that this "stack gas" is basically air and needs no further treatment with respect to the surrounding environment. It could also be available for process needs in a cogeneration application.

Air input into the furnace 110 or means for producing a hot exhaust gas stream is derived from a boost compressor 160 which is connected to the plurality of main compressors through shaft 162 and which is, in turn, driven by the air turbine 101. The boost compressor 160 is used to more efficiently match the stoichiometry and pressure requirements of the furnace 110. The boost compressor discharge air is sent to the means of generating a hot exhaust gas stream through a third heat exchanger 170. The hot side input to the heat exchanger is the discharge hot exhaust gas stream 172 from the first heat exchanger 116 whereas the cold side input into the third heat exchanger is the boost compressor discharge air 166. If the process to which the air turbine cycle is applied is similar to the process for producing sulfur where the process stream is required to be at a higher temperature, then the third heat exchanger 170 may not be used and the stream goes "to process" as indicated by dashed line. If the process stream is needed at a low temperature, then the third heat exchange process may be for reducing the temperature of the product gas; whereas, if the process is for producing a power output from a coal or other such fuel, then the third heat exchange may be for recovery of exhaust heat from the furnace by prewarming the boost compressor air which may lower the heat rate of the means for producing a hot exhaust gas stream.

In accordance with the present invention therefore, there has been shown the air turbine 101 having an air inlet 120 and an air turbine exhaust 142. The plurality of main compressors 102, 124 and 130 are connected in tandem and driven by the air turbine 101. Each pair of main compressors has an intercooler 128, 132 interposed therebetween. The means for generating a hot exhaust gas stream is a furnace 110 which may be used for burning a chemical for process reasons or coal for the sole purpose of producing heat. The first heat exchanger 116 is used to pass the compressor discharge air 118 in heat exchange relation with the hot exhaust gas stream 114 for the purpose of heating the compressor discharge air. The second heat exchanger 140 is used for preheating the compressor discharge air prior to its input into the first heat exchanger with the benefit of preheating the air into the air turbine for increased cycle output by recovering heat from the air turbine exhaust gas. The boost compressor 160 provides an air input into the means for generating a hot exhaust gas stream 110 whereas the third heat exchanger 170 provides a heat exchange between the boost compressor discharge air and the exhaust gas stream after it has passed through the first heat exchanger 116.

The advantages of the foregoing described air turbine cycle includes the achievement of high cycle efficiency without the use of water or steam. The products of combustion never enter the air turbine and thus the air turbine materials selection is not compromised by corrosion concerns. The critical material concerns are therefore left only to the means for producing a hot exhaust gas stream and to the first and third heat exchangers in the flow path of the hot exhaust gas stream. The combustion is performed with specified stoichiometry; in the case of a coal fired furnace with minimum excess air so that any subsequent stack gas cleanup of the hot exhaust gas stream is performed on a minimum volume of gas, and in the case of a chemical furnace to achieve desired product composition. Because of the use of the second heat exchanger for recuperation of the turbine exhaust gas output and the use of the third heat exchanger with respect to the incoming boost compressor discharge air and the outgoing hot exhaust gas stream the stack discharge temperatures are at a minimum ensuring maximum heat recovery throughout the cycle. The combination of heat addition at moderately high temperature and all heat rejection at low temperature affords good efficiency. For cogeneration applications there are three streams of clean, hot air including the turbine exhaust, and the two intercoolers.

While there has been shown what is considered to be the preferred embodiment of the present invention, other modifications may occur to those having ordinary skill in the art. It is intended to claim in the appended claims all such modification which fall within the true spirit and scope of the appended claims.

What is claimed is:

1. An air turbine cycle comprising:
an air turbine having an inlet and an exhaust;
at least two main compressors for supplying air to the air turbine inlet; the air turbine drivingly connected, in tandem, to the main compressors;
an intercooler connected between the at least two main compressors;
means for generating a hot exhaust gas stream;
a first heat exchanger for heating the air supply to the air turbine inlet; the first heat exchanger connected to the means for generating a hot exhaust gas stream and the air supply whereby hot air is supplied to the air turbine;
a second heat exchanger for preheating the air supply to the air turbine inlet; the second heat exchanger connected to the air turbine exhaust for passing hot turbine exhaust in heat exchange relationship with the air supply;
a third heat exchanger for preheating a second air supply connected to the means for generating a hot exhaust gas stream; the third heat exchanger connected to the hot exhaust gas outlet of the first heat exchanger; and,
a boost compressor for supplying the second air supply connected to the means for generating a hot exhaust gas stream; the air turbine drivingly connected to the boost compressor and the main air compressors.

* * * * *